(12) United States Patent
Sariani

(10) Patent No.: US 11,207,158 B2
(45) Date of Patent: Dec. 28, 2021

(54) ANGULAR ABUTMENT FOR DENTAL IMPLANTS

(71) Applicant: Gaby Sariani, Tel Aviv-Jaffa (IL)

(72) Inventor: Gaby Sariani, Tel Aviv-Jaffa (IL)

( * ) Notice: Subject to any disclaimer, the term of this patent is extended or adjusted under 35 U.S.C. 154(b) by 0 days.

(21) Appl. No.: 17/188,495

(22) Filed: Mar. 1, 2021

(65) Prior Publication Data

US 2021/0338382 A1 Nov. 4, 2021

Related U.S. Application Data

(63) Continuation of application No. 17/171,570, filed on Feb. 9, 2021.

(60) Provisional application No. 63/017,746, filed on Apr. 30, 2020.

(51) Int. Cl.
*A61C 8/00* (2006.01)
*G06Q 10/08* (2012.01)

(52) U.S. Cl.
CPC .......... *A61C 8/006* (2013.01); *A61C 8/0053* (2013.01); *G06Q 10/083* (2013.01)

(58) Field of Classification Search
CPC ....... A61C 8/006; A61C 8/0053; A61C 8/005; A61C 8/0048; A61C 8/0068; A61C 8/0001; A61C 8/008; A61C 8/0077; A61C 8/0066; G06Q 10/083
USPC ...................................... 433/172–173, 201.1
See application file for complete search history.

(56) References Cited

FOREIGN PATENT DOCUMENTS

EP         2444023 A1 *  4/2012   ............. A61C 8/005

* cited by examiner

*Primary Examiner* — Nicholas D Lucchesi
*Assistant Examiner* — Mirayda A Aponte
(74) *Attorney, Agent, or Firm* — Tutunjian & Bitetto, P.C.

(57) ABSTRACT

A series of at least three abutments for dental use and a method for selection and aligning an abutment therefrom in a patient mouth. The series comprises at least three abutments. Each abutment composes a mate of a polygonal rotation preventive adapter having an axis of rotation perpendicularly to a lateral cross section, and a support member extending from a proximal end of the mate and having rotational symmetry to the axis of rotation. A projection of the support member on a plane of the lateral cross section in at least one abutment, is asymmetric with respect to angle bisectors and medians of the polygonal shape. An angle between a straight line extending from the axis of rotation to a reference point on a projection circumference of the support member forms a unique offset angle with a side of the polygonal shape per each dental abutment in the series.

9 Claims, 3 Drawing Sheets

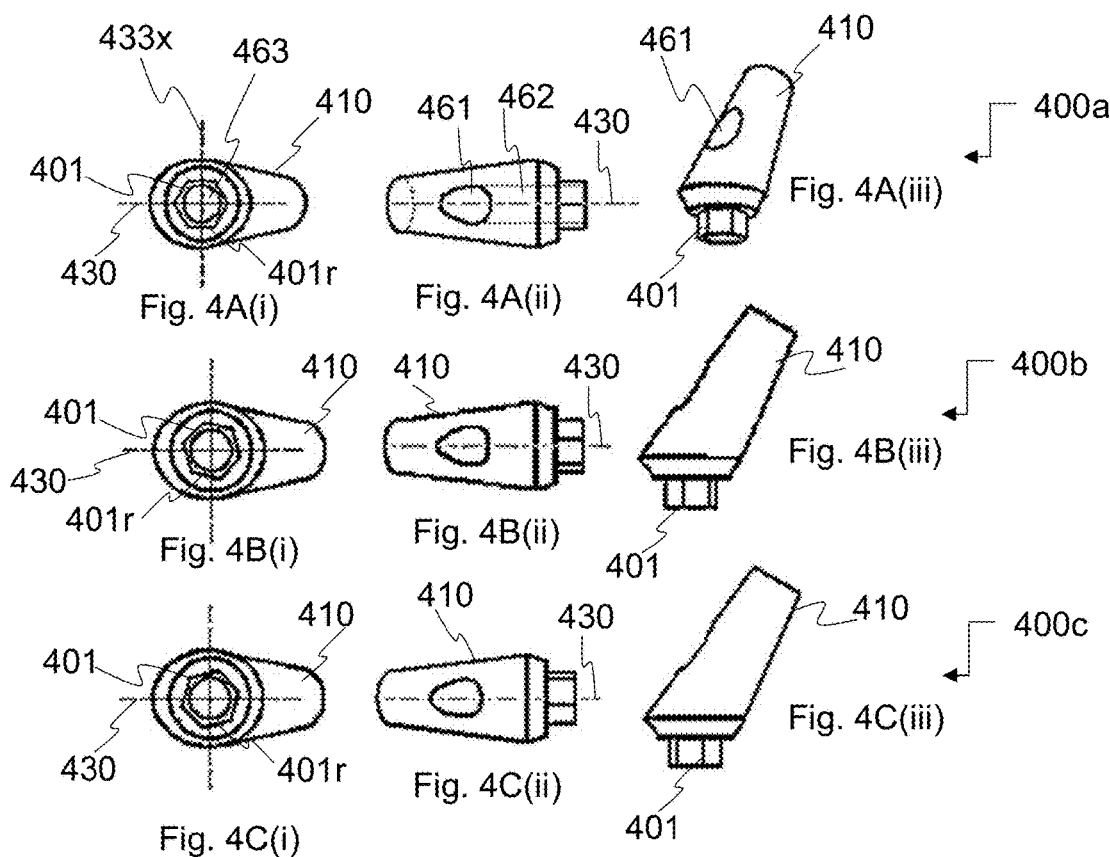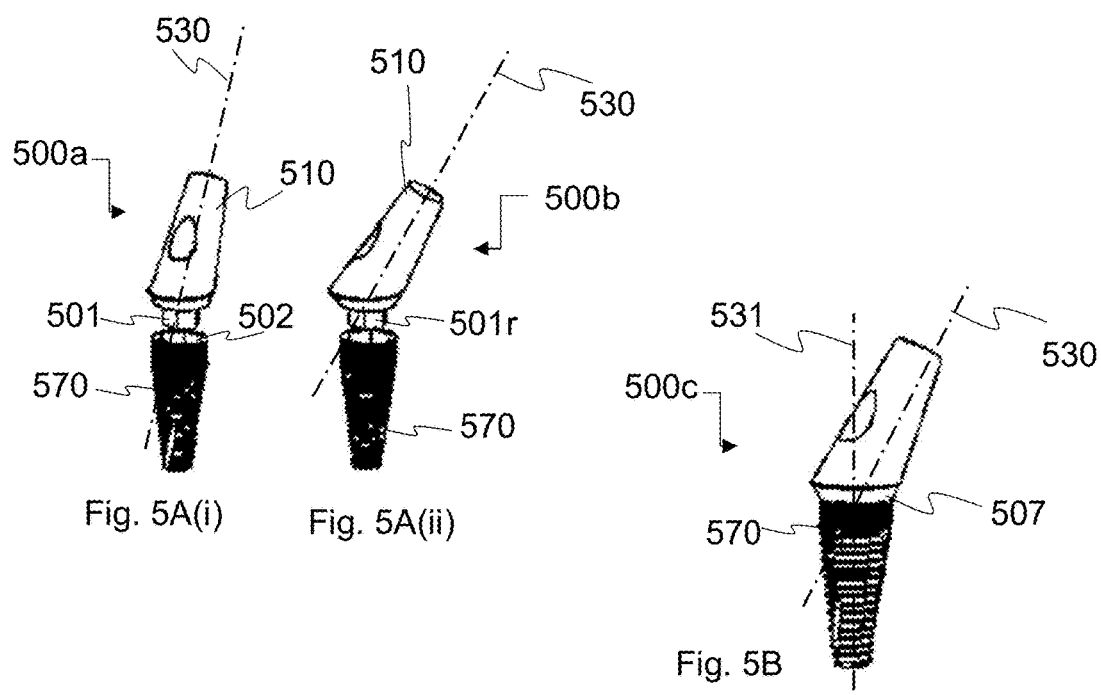

ANGULAR ABUTMENT FOR DENTAL IMPLANTS

CROSS-REFERENCE TO RELATED APPLICATION

This application claims the benefit of provisional patent application No. 63/017,746 filed Apr. 30, 2020, titled "ANGULAR ABUTMENT FOR DENTAL IMPLANTS", which is hereby incorporated by reference in its entirety without giving rise to disavowment.

TECHNICAL FIELD

The present disclosure relates to the field of Prosthodontics in general, and to angular abutment for dental implants, in particular.

BACKGROUND

A dentistry abutment (hereinafter 'abutment') is a connecting element that may be used to attach a dental prosthesis such as a crown, a bridge, a removable denture, or the like, to a dental implant fixture. Abutments are made from a variety of materials, such as titanium, surgical stainless steel, gold, or the like. In individual tooth replacement, commonly abutments may be secured to the dental implant with an abutment screw. Once secured, the dental prosthesis may be connected to the abutment with a dental cement, a small screw, or the like. Crowns or and fixed partial dentures may, accordingly, have a cemented or screw retained fixation on the abutment. Alternatively, dental prostheses may be supplied fused or integrated with the abutment, i.e. prepared in advance with the abutment, as one piece. Dental implants, may also be used to retain a multiple tooth dental prosthesis either in the form of a fixed bridge or of removable dentures. Bridges may be connected to more than one implant. Dental implants may also be connected to teeth as anchor points, or the like.

Each dental implant may have positioning interface with which intended abutments should match in contour, in dimensions and in the connective method by which the abutment may become permanently secured to the implant.

According to the type of prosthesis which the abutment is intended to support, the abutment may be shaped as or contain a connector portion, in the form of e.g. a button, a ball, a bar, a protrusion having a predetermined contour, a magnet, or the like, matching an analogous connector portion facing from an underside of the dental prosthesis.

BRIEF SUMMARY

One exemplary embodiment of the disclosed subject matter is a series of abutments for dental use, comprising a plurality of abutments, the series comprises at least three abutments, each abutment comprising: a first mate of a polygonal rotation preventive adapter having in a lateral cross section thereof a contour being a polygonal or virtually inscribed in a polygonal shape, and having an axis of rotation perpendicularly to said lateral cross section, said first mate being configured to engage with a second mate of the polygonal rotation preventive adapter formed in an intended dental implant, wherein each interior angle of said polygonal shape is geometrically associated with an angle bisector, wherein each side of said polygonal shape is geometrically associated with a median; and a prosthesis support member extending from a proximal end of said first mate and having rotational symmetry order 3 or less with respect to said axis of rotation; wherein at least in one of the abutments, a projection of the prosthesis support member on a plane of said lateral cross section is asymmetric with respect to the angle bisectors as well as with respect to the medians, of the polygonal shape, and wherein an angle between a straight line extending from the axis of rotation to a predetermined geometrical reference point on a circumference of the projection of the prosthesis support member forms a predetermined offset angle with a side of the polygonal shape, wherein the offset angle is unique per each dental abutment in the series.

Optionally, the prosthesis support member is an inclined abutment member, wherein a first projection of a longitudinal axis of the inclined abutment member on the plane of said lateral cross section, forms a predetermined offset angle with a second projection being a projection of a straight line tangent to a selected side of the first half of the polygonal rotation preventive adapter on said plane; wherein the offset angle is unique per each dental abutment in the series, and wherein the first projection of at least one of the abutments in the series is unique in that it is unparallel to angle bisectors and unparallel to medians of the polygonal shape.

Optionally, the number of sides of the polygon contour, is between three and eight.

Optionally, the polygon is a hexagon.

Optionally, the offset angle is the sum of a predetermined first angle and a division by a predetermined whole number between three and ten, of a central angle between neighboring angle bisectors of the polygon.

Optionally, the number of angled abutments in the series is smaller by one from the predetermined whole number.

Optionally, the angled abutments in the series structurally differ one from another only in the size of the offset angle.

Another exemplary embodiment of the disclosed subject matter is a method of aligning a prosthesis within a patient's mouth, the method comprising: implanting a dental implant in a selected position within the patient mouth; providing a series of abutments having characteristics according to the disclosed series of abutments; selecting from the series a first abutment having a first offset angle and securing it temporarily on top of the dental implant; temporarily positioning the prosthesis on the selected abutment and examining if the dental prosthesis is in satisfying alignment with neighboring objects within the patient's mouth; in case the alignment does not satisfy, skipping to step (vi), or resecuring the first abutment temporarily in another orientation as allowed by the polygonal rotation preventive adapter and repeating examining whether the dental prosthesis became satisfactorily aligned; in case the alignment still does not satisfy, repeating steps (iii) to (v) with a second abutment from the series, in substitution of the first, wherein the offset angle of the second abutment is greater or smaller by a first predetermined amount of degrees than the offset angle of the first; in case the alignment still does not satisfy, repeating steps (iii) to (v) with a third abutment from the series, in substitution of the first, wherein the offset angle of the third abutment is greater or smaller by a second predetermined amount of degrees than the offset angle of the first;

Yet another exemplary embodiment of the disclosed subject matter is a method for automated selection of an abutment for a prosthesis to be secured to that abutment within a patient's mouth, the method comprising: providing a three-dimensional image of at least a region of a patient's mouth in which the prosthesis is intended to be situated, wherein said image includes an image of a proximal portion of a dental implant to which the abutment to be selected is to be permanently connected; activating an image processing algorithm for recognizing at least the spatial orientation of the dental implant with respect to dental constituents neighboring to a space to be occupied by the prosthesis; based on said recognizing and on parameters of said dental constituents, calculating a set of values with respect to a predetermined set of abutment parameters which an abutment having abutment parameters with such set of values may suit for intermediating between the dental implant and the prosthesis, and memorizing the results of said calculating as a desired set of values; searching for abutments having individual set of values within a predetermined tolerance from the desired set of values, within a database of a multiple series of abutments according to claim 1, which the database includes per each abutment an individual set of values per the predetermined set of parameters, and memorizing results of said searching as a list of one or more series of abutments ranked by proximity of their individual set of values to said desired set of values; or providing from said database a list of series of abutments ranked according to proximity of individual set of values of abutments in each series to said desired set of values.

Optionally, the method further comprising submitting an order to a relevant supplier of dental abutments, for one or more series of abutments from the list, based on a computerized decision taken under considerations of rank of a series of abutments in the list, price, and estimated delivery date.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 1A:
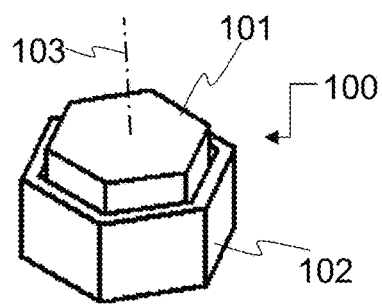
FIG. 1A shows a schematic illustration of an isometric view of an exemplary positioning interface between an abutment and a dental implant, in accordance with some exemplary embodiments of the disclosed subject matter.

FIGS. 4A-4C (i)-(iii) show schematic illustrations of different views of abutments having an angled structure, in accordance with some exemplary embodiments of the disclosed subject matter; and FIGS. 5A (i)-(ii) and 5B show schematic illustrations of a series of abutments, in accordance with some exemplary embodiments of the disclosed subject matter.

DETAILED DESCRIPTION

One technical problem dealt with by the disclosed subject matter is the limited freedom in varying the angle by which an abutment having rotational asymmetry with respect to a longitudinal axis of an intended dental implant, will be positioned and secured to the intended dental implant. Limited freedom in varying the angle of the abutment with respect to the implant may result with difficulties in fitting the orientation of dental prostheses with the unique structure of mouth and teeth of a patient.

Consider an abutment is configured to be assembled on top of a dental implant for a dental prosthesis to be attached thereto. As mentioned above, the abutment may have rotational asymmetry with respect to a longitudinal axis of the intended implant. Prior to permanently securing such abutment to the implant, it may be required to bring the angular position of the abutment about the longitudinal axis of the implant as close as possible to a position in which the prosthesis is in (or yet may be aligned to) a desired orientation in the patient's mouth, e.g. satisfactorily in line, or best fit, with neighboring teeth or prostheses.

In some exemplary embodiments in which said difficulties may exist, the connection between the implant body and the abutment may comprise a conical sealing fit between the implant and the abutment, and may further comprise a rotation preventive arrangement, for guaranteeing that the abutment will not turn from its predetermined orientation, even in case the torque applied to it through the prosthesis happen to exceed the torque that the abutment securing screw may retain while abutment is maintained immovable.

In some exemplary embodiments, the rotation preventive arrangement may be based on a non-round male and female alignment adapter, e.g. a polygonal alignment adapter. The polygonal alignment adapter may be, for example, an inner hexagonal male and female alignment adapter. Additionally or alternatively, other regular polygons may be utilized for the inner connection between the implant body and the abutment. However, the same limitation on the number of positioning may arise.

For example, the dental implant may comprise a hexagonal recess, and the abutment may have a hexagonal-shaped protrusion that fits into the hexagonal recess of the implant, or vice versa. While such connections may ensure precise tight-tolerance geometries having anti-rotation capabilities, the hexagonal alignment adapter configuration may present limitations resulting with difficulties as discussed above, as only six angularly spaced positions of the abutment on the dental implant are allowed.

Polygons having number of sides other than six may be utilized for the rotation preventive connection between the implant body and the abutment, but similar limitations on the number of angularly spaced positions may still arise, respectively. This is apart from reliability issues which may arise as the number of sides becomes larger, hence the polygon more closely resembles a circle.

In some exemplary embodiments in which said difficulties may exist, the angle of connection between the implant and the abutment may be an important feature to consider, when choosing an implant system. Implant failure may result from how the restorative phase is managed. Correct orientation of the abutment in the site of restoration, may be vital for successful outcomes. Optimization of angle of connection between the implant and the abutment can improve esthetics and longevity and may provide for a secure joint.

In some exemplary embodiments in which said difficulties may exist, the abutment may have an angular structure. Such abutment may be referred to herein also as 'angled abutment'. The angular structure of the abutment may comprise a first abutment member having a longitudinal axis intended to form an angle with the longitudinal axis of an intended implant, and a second abutment member having a longitudinal axis angled to the longitudinal axis of the first abutment member. In various exemplary embodiments, the abutment may be designed such that the longitudinal axis of the first abutment member is overlapping with the longitudinal axis of the implant (i.e. the angle between the longitudinal axis of the first abutment member and the longitudinal axis of the implant is of 180 degrees). In various exemplary embodiments, the abutment may be designed such that the longitudinal axis of the second abutment member is inclined to the longitudinal axis of the first abutment member, i.e. the longitudinal axes of the first and the second abutment members form an angle other than 180 degrees.

In some exemplary embodiments, such angular structure may be essential, such as when the implant is drilled angularly to the teeth, and an abutment of angular structure may be required in order to create a position of the abutment that enables the prosthesis to be parallel to existing teeth. In such angularly drilled implant, scenario, the configuration of the abutment assembling onto the implant and mutual connection therebetween, may be of high importance. For example, in case a hexagonal male female anti-rotation arrangement is used, there may be only six alternative options for achieving different results in the alignment of the prosthesis with its neighboring teeth. However, the difference between any two options may be no less than 60 degrees, and this may pose a significant deviation in terms of prosthesis alignment with the other teeth. Intermediate positioning options, that allow for finer tuning of the angle of the abutment with respect to the implant, may therefore be required, between every two successive positions of the abutment that are allowed by the hexagonal anti-rotation arrangement.

Angular orientations other than the angular orientations allowed by a polygonal anti-rotation arrangement may be tailored individually per each case, e.g. by grinding the upper portion of the abutment or the matching positioning means in the bottom of the prosthesis (such as by the dentist or by the dental technician). Such individual adaptation may be disadvantageous both in terms of the thinning and consequently the weakening caused to the abutment and/or the prosthesis by the grinding, and of the labor involved.

Hypothetic multi-part abutment that can be assembled to provide for satisfying orientation about the implant, is a complicated solution, and of need for approving its reliability, longevity, and cost effectiveness, all believed to be highly doubtful.

A solution based on an abutment having a static shape, without moving parts (apart from a screw for securing the abutment to the implant), may therefore be preferred.

One technical solution is to provide a series comprising at least three angled abutments. The at least three angled abutments may be similar in size and in structure, and differing one from another in the amount of rotation (hereinafter referred to also "angular offset") by which a male (or female) half of a polygonal male and female rotation preventive adapter of each of the abutments in the series, is rotated from a reference position. The reference position is the position of the male (or female) half of the polygonal male and female rotation preventive adapter, in a reference abutment selected from the series, with respect to a longitudinal axis of a prosthesis support structure of the abutment. The amount of rotation from the reference position, can be measured around a longitudinal axis of the rotation preventive adapter.

In various embodiments of the disclosed subject matter, a polygon in the polygonal male and female rotation preventive adapter (abbreviated and referred to also as 'RPA') may be a hexagon. A minimal angular space between two successive directions toward which the prosthesis support structure of the abutment may be aligned is as small as 20 degrees in case the series comprises three abutments, 15 degrees in case the series comprises four abutments, 12 degrees in case the series comprises five abutments, and so on.

Additionally or alternatively, a polygon in the polygonal male and female RPA may be a regular (i.e. equilateral and equiangular) hexagon.

In various embodiments of the disclosed subject matter, the angular offset (in degrees) by which a male (or female) half of the polygonal male and female rotation preventive adapter of each of the abutments in the series, is rotated from the reference position, may be a whole number multiplication of 360 degrees divided by a whole number multiplication of the number of sides of the polygon. As a result, assuming a hexagonal RPA, each abutment additionally to the reference abutment, may provide for six new selectable orientations. As an example, using a series of only three abutments (two beyond the reference abutment), may allow for eighteen alternative positioning options of the abutment on the dental implant.

In some exemplary embodiments, each abutment in the series may be designed to be distinguishable from the other abutments, such as being marked with the associated rotation offset, being dyed in a different color, or the like.

In some exemplary embodiments, a computerized system may be utilized to assist selecting the abutment which will most accurately fit, based on visual input of the patient's mouth. The disclosed series of abutments may be easily fit into existing systems or scanning software in each laboratory or dental clinic, such as by updating the relevant abutment library, updating the relevant software to perform an additional selection over the series of abutments replacing the previously selected abutment, or the like. Additionally or alternatively, a parallelism determining device (Parallelometer) may be developed based on the series of abutments. Such Parallelometer may be configured to scan the patient's mouth or a model thereof, and instruct the dental technician or dentist which abutment from the series to select in order to provide a best positioning of the prosthesis.

One technical effect of utilizing a series of abutments according to the disclosed subject matter is the enablement for dentists and clinicians to easily attach abutments to dental implants in the desired angle and orientation that satisfactorily fits with the orientations of other teeth in the mouth of a patient, while making use of a generic abutment without the need to create a unique abutment per each patient. The disclosed subject matter provides for simple uncomplicated solutions for the provision of both horizontal and vertical orientations of the prosthesis support structure of the abutment, ending up with a single piece abutment affixed to the dental implant. An abutment according to the disclosed subject matter may be valid for all forms of dental implants, regardless of the exact form of RPA associated with the implant, regardless of the shapes of the entry, such as hexagon, square, triangle, or the like, regardless of the side (i.e., male or female half of the RPA), or the like. Furthermore, the abutments according to the disclosed subject matter may be configured in a variety of types, including types differing in the angle of their angular structure, and/or comprising prosthesis related spherical attachment, angulated ball attachment, angulated Loc-in attachment, flat attachment, angulated multi-units, or the like.

Another technical effect of utilizing the disclosed subject matter, is to enable of a maximal coverage of positioning of dental prosthesis using a minimal number of dental abutments, without requiring additional designs of the dental implant or the prosthesis. Referring to above mentioned example, replacing one regular abutment of hexagonal RPA with a series of only three abutments, may enhance the coverage from six positions (each 60 degrees), to eighteen positions with 20 degrees therebetween, thereby enabling a better coverage and a more accurate alignment of the prosthesis with other teeth or other prostheses within the patient's mouth. As another example, replacing one regular abutment with a series of only six abutments, may enhance the coverage from six positions (with 60 degrees), to 36 positions, with only 10 degrees therebetween.

Yet, another technical effect of utilizing a solution according to the disclosed subject matter is the save in time and effort invested by the dental technician and the reduction in the burden associated with the process of determining the orientation of the abutment that enables a correct parallel positioning with other teeth in the patient's mouth. Current solutions require a massive grinding work on the upper structure (e.g., upper portion) on the abutment after being assembled, in order to provide for an accurate alignment of the prosthesis. With the proposed solution, the abutment may remain in its original form without damaging the implant as well as without reducing the surface area of the abutment. Such effect may also apply to adjusting abutments in the mouth, as limitations on angles of positioning the abutments in the mouth are reduced. The solution according to the disclosed subject matter may greatly contribute in the developing medical digital world and may provide for new possibilities, quick troubleshooting and speeding up work without dependence on dental laboratories.

DETAILED DESCRIPTION OF THE FIGURES

Referring now to FIG. 1A illustrating an isometric view of an exemplary connection between an abutment and a dental implant, in accordance with some exemplary embodiments of the disclosed subject matter.

In some exemplary embodiments, the connection between the abutment and the dental implant may be achieved as a male and female rotation preventive adapter (RPA) having a hexagonal design. RPA 100 may be typical anti-rotation arrangement configured to determine the angular relationship between a dental implant and a related abutment. RPA 100 may be configured to fix the abutment to the dental implant based on hexagonal male and female adapters. RPA 100 may comprise a hexagonal Protrusion 101 and a matching hexagonal Recessed Body 102. One of Protrusion 101 and Recessed Body 102 may be formed on top of a dental implant, and the other on bottom of an abutment.

In some exemplary embodiments of the disclosed subject matter, the dental implant may comprise a recess shaped as polygonal hole, such as Recessed Body 102 having a hexagonal hole. I abutment may have a polygonal-shaped protrusion having a shape matching the polygonal hole, such as hexagonal-shaped Protrusion 101, that may be configured to fit to the hexagonal hole of Body 102. Additionally or alternatively, Protrusion 101 and Recessed Body 102 may be arranged in an opposite manner. Protrusion 101 may be comprised by the dental implant, while Recessed Body 102 may be comprised by the abutment.

In some exemplary embodiments, an angled abutment may be fit onto the dental implant in six positions. Each position may correspond to one of six different orientations of the abutment inside a patient's mouth. Each position may be achieved based on the direction of the abutment being angled with respect to a longitudinal axis of the RPA 100, in accordance with the six options of inserting the hexagonal-shaped Protrusion 101 into the hexagonal hole of Recessed Body 102.

Figure 1B:
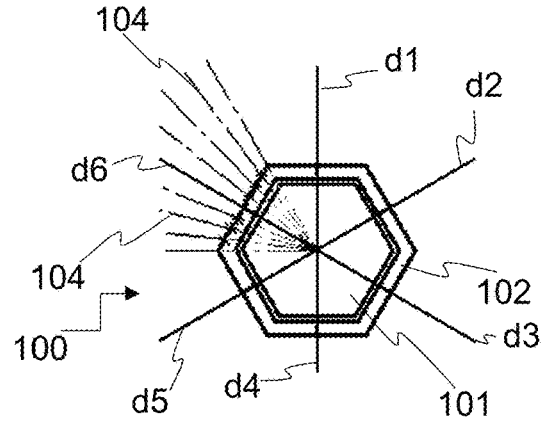
FIG. 1B shows a schematic illustration of a top view of an exemplary positioning interface between an abutment and a dental implant, in accordance with some exemplary embodiments of the disclosed subject matter.

Referring now to FIG. 1B illustrating a top view of an exemplary connection between an abutment and a dental implant, in accordance with some exemplary embodiments of the disclosed subject matter.

In some exemplary embodiments, RPA 100 may be a cross sectional view of a lateral sectioning through RPA 100 illustrated in FIG. 1A. The illustration is marked with several angularly spaced axes. Axes marked with a solid line (d1-d6) represent directions which the hexagonal RPA 100 can take (i.e., which the medians of the sides of the hexagonal RPA can be aligned toward). Axes marked with a dashed line (104) represent some directions that the hexagonal RPA cannot take, yet may better the positioning of the prosthesis, should one of them had been taken.

In some exemplary embodiments, RPA 100 may be associated with an abutment. The abutment may be mounted on a dental implant in a first position of the six corresponding possible positioning. Five additional positioning possibilities result based on how the protrusion 101 is situated within recessed body 102 As a result, the structure of the upper portion of regular abutments may be positioned only in six directions in a patient's mouth, having an angle of 60 degrees therebetween. In some cases, more accurate positioning options, e.g., directions angularly spaced by angles substantially smaller than 60 degrees, may be required in order to fit the dental prosthesis accurately.

Figure 2A:
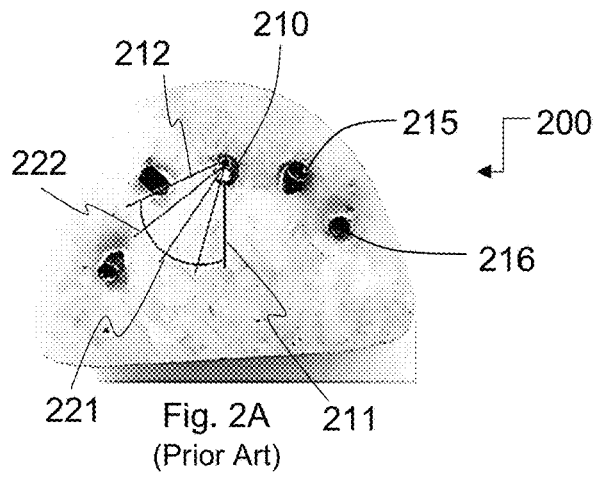
FIGS. 2A and 2B show illustrations of abutments mounted to dental implants within a patient's mouth, in accordance with some exemplary embodiments of the disclosed subject matter.
Figure 2B:
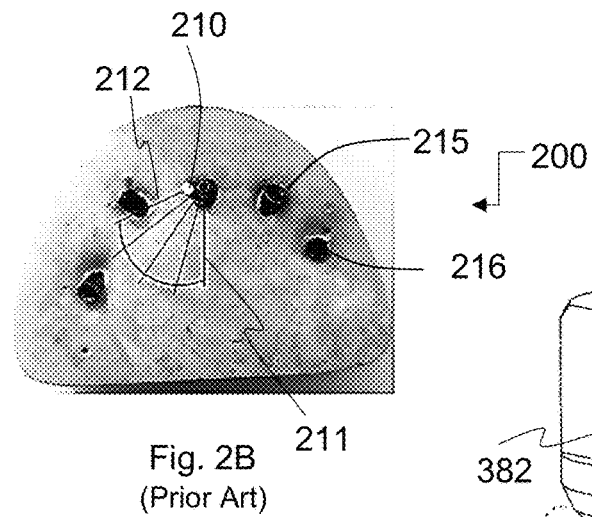

Referring now to FIGS. 2A and 2B illustrating a schematic top view of an exemplifying patient's jaw having spaced apart implants, in accordance with some exemplary embodiments of the disclosed subject matter.

In some exemplary embodiments, an Abutment 210 attached to Jaw 200 may be associated with a hexagonal RPA (such as illustrated in FIG. 1A). Other implants, such as 215-218, may exist in Jaw 200. Abutment 210 may be required to be attached to Jaw 200, in a manner allowing a parallel alignment of the associated prosthesis with prostheses associated with the other implants. Abutment 210 having a regular structure, may be mounted to an associated dental implant in six optional angularly spaced orientations within a patient's mouth, parallel to the symmetry axes passing through the six vertexes of the hexagon. As a result, only six positions of the abutment in the mouth may be optional, with 60 degrees between each pair of options. As an example, Abutment 210 may be mounted in a first orientation directed according to the solid line marked 211, such as shown in FIG. 2A, or in a second orientation directed according to the solid line marked 212, such as shown in FIG. 2B. Additional orientations, such as the orientation directed according to the line marked 221, 222, or 223 may be required in order to fit Implant 218 or other implants within Jaw 200. However, such orientations may not be achieved by the hexagonal RPA shown in FIG. 1A. The disclosed subject matter enables situating the implant in any orientation of interest, that the hexagonal RPA does not allow.

Figure 3A:
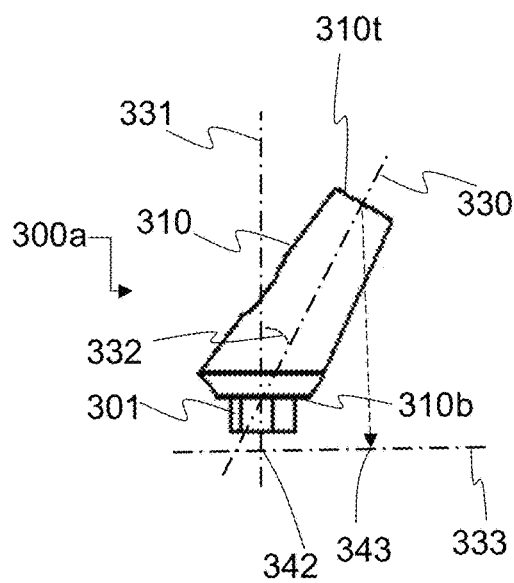
FIG. 3A shows a schematic illustration of a side view of an abutment having an angled structure, in accordance with some exemplary embodiments of the disclosed subject matter.

Referring now to FIG. 3A showing a schematic illustration of a side view of an angled abutment 300*a*, in accordance with some exemplary embodiments of the disclosed subject matter.

An angled abutment is one example of an abutment lacking Rotational Symmetry. A shape has Rotational Symmetry about an axis when it still looks the same after some rotation of less than one full turn, about the axis. The maximal number of times a shape looks the same after some rotation in the same direction (either clockwise or counterclockwise) about the axis before completion of one full turn, will be referred to herein as order. Lacking rotational symmetry may be referred to as a Rotational Symmetry of order 0, since it does not look the same after some rotation of less than one full turn.

In some exemplary embodiments, an Angled Abutment 300 having an angled structure may comprise an inclined Abutment Member 310 having a Longitudinal Axis 330 forming an Angle 332 with a Longitudinal Axis 331 of the polygonal alignment adapter portion 301 associated with the angled abutment 300. The Longitudinal Axis 331 may overlap with the Longitudinal Axis 531 of an intended dental implant such as 570 of FIG. 5B.

In some exemplary embodiments, Abutment Member 310 may be tilted with respect to a Horizontal Axis 333. Horizontal Axis 333 may be perpendicular to Longitudinal Axis 331 of the dental implant (which typically is also the axis of rotation of the dental implant, about which the implant is drilled into a patient's jawbone). Abutment 300 having the inclined Abutment Member 310 may further comprise a half (e.g., the male half-adapter) of a male and female RPA 301, such as the hexagonal protrusion of the RPA of FIG. 1, formed at its bottom 310*b*. Consequently, a projection of Longitudinal Axis 330 of the inclined Abutment Member 310 on a Horizontal Plane 333 (i.e. a plane orthogonal to the longitudinal axis 331 of the RPA), can take any selected one of six angularly spaced directions on the dental implant. In the context of the present disclosure, the projection of the Longitudinal Axis 330 on the Horizontal Plane 333, may be understood as a line section extending from point 342 through point 343.

Given a predetermined position of a dental implant inside a patient's mouth (and hence the position of the female half-adapter, which is formed at the top end of the dental implant), the six optional directions, angularly spaced each from a neighboring one by a 60 degrees angle, are predetermined within the patient's mouth, in accordance with the predetermined orientation of the male half-adapter, with respect to the projection of the longitudinal axis of the inclined abutment member on said horizontal plane.

In the context of this disclosure, the Longitudinal Axis 330 of the inclined Abutment Member 310, is the axis line which passes through both the middle of the top 310*t*, and the middle of the bottom 310*b*, of the inclined abutment member.

It is appreciable from FIG. 3A, that the hexagonal protrusion 301 is oriented asymmetrically to the projection (between points 342 and 343) of the Longitudinal Axis 330 of the Inclined Abutment Member 310, on the Horizontal Plane 333. The asymmetric orientation is both with respect to angle bisectors and with respect to medians of the projection of the hexagonal protrusion 301, on the same Horizontal Plane 333. Accordingly, the projection (between points 342 and 343) of the Longitudinal Axis 330 of the Inclined Abutment Member 310, on the Horizontal Plane 333, is unparallel both to said angle bisectors and to said medians. The asymmetry described, is apparent in FIG. 3, from the asymmetry of the vertexes of the hexagonal protrusion (depicted by the four vertical lines illustrating the protrusion), with respect to the Longitudinal Axis 331, and assuming the Longitudinal Axis 330 of the Inclined Abutment Member 310 lay in a plane parallel to the plane of the drawing.

Figure 3B:
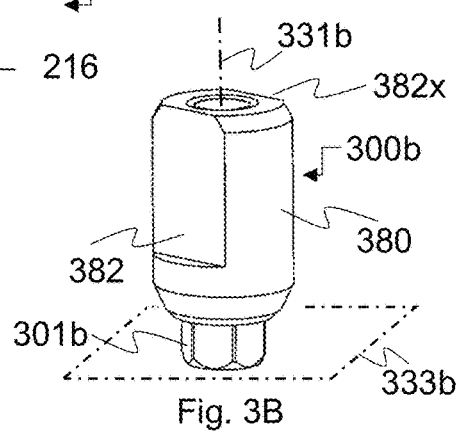
FIG. 3B shows a schematic illustration of an isometric view of an abutment, having a straight structure with limited rotational symmetry, in accordance with some exemplary embodiments of the disclosed subject matter.

Referring now to FIG. 3B showing a schematic illustration of an isometric view of an abutment 300*b* having Rotational Symmetry order 2, in accordance with some exemplary embodiments of the disclosed subject matter.

Figure 3C:
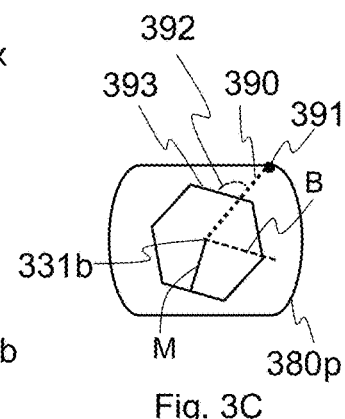
FIG. 3C shows two cross section views of the abutment of FIG. 3B projected on a plane for introducing some of their geometrical relationships.
Figure 3D:
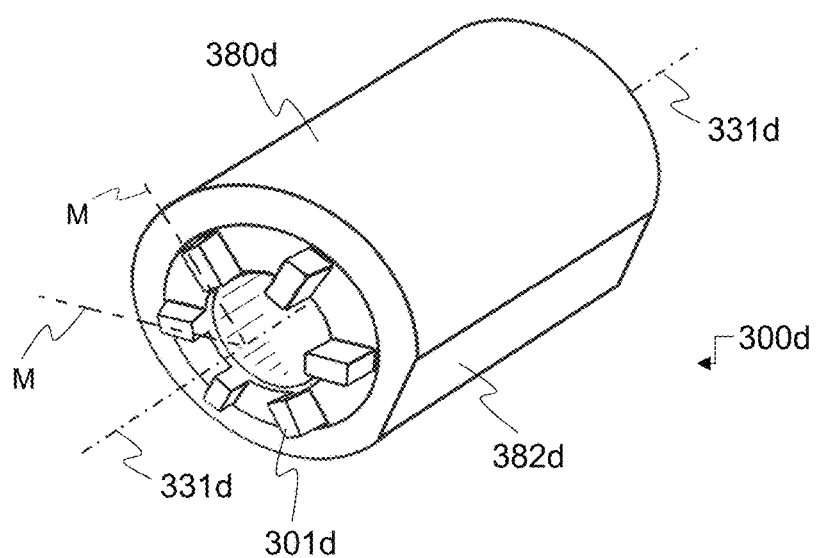
FIG. 3D shows a schematic illustration of an isometric view of an abutment, having a straight structure with limited rotational symmetry, and also having a non-polygonal rotation preventive adapter in accordance with some exemplary embodiments of the disclosed subject matter.
Figure 3E:
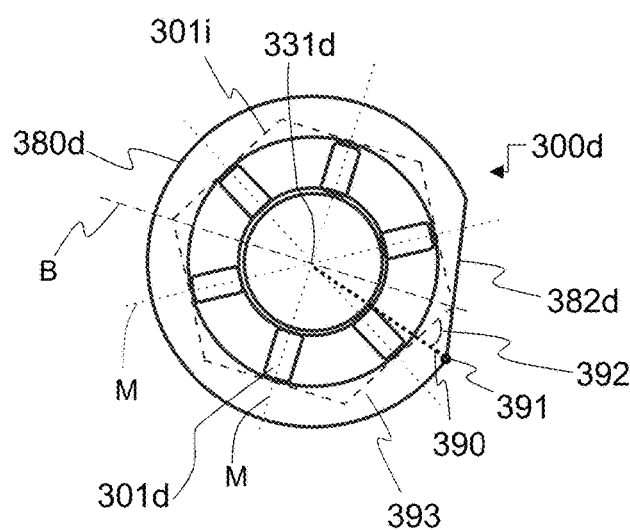
FIG. 3E shows a bottom view of the abutment of FIG. 3D, annotated with a polygonal inscriber, angle bisectors and medians, for introducing some of its geometrical features.

The abutment 300*b* is a straight abutment, having a longitudinal axis 331*b* intended to overlap with a longitudinal axis (e.g., 531 of FIG. 5B) of an intended dental implant (e.g., 570 of FIG. 5B). The abutment 300*b* comprises an abutment member 380 constituting prosthesis support member, generally cylindrical in it shape, except for two planner regions 382 and 382*x*, formed on opposite sides of its otherwise cylindrical structure. The abutment member 380 looks the same upon rotation by 180 degrees about the axis 331*b* (which will simply switch between the positions of planner regions 382 and 382*x*) and is thus of Rotational Symmetry order 2. In various embodiments according to the disclosed subject matter, the prosthesis support member may lack Rotational Symmetry (a lacking which in the context of the present disclosure referred to also as Rotational Symmetry order less than 2). Another example for prosthesis support member lacking Rotational Symmetry (in addition to the prosthesis support member constituted by the angled abutment member such as 310 of FIG. 3A), is a prosthesis support member similar to abutment member 380 but having only one of the planner regions 382 and 382*x*. FIG. 3D illustrates such abutment, 300*d*, having only one planner region 382*d*, and which therefor does not look the same upon any amount of rotation smaller than a full turn about its longitudinal axis 331*d*, thus is lacking rotational symmetry. Referring now to both FIGS. 3D and 3E, the abutment 300*d* further differs from the abutment of FIG. 3B in the design of its rotation preventive adapter, which is based on a plurality of angularly spaced protrusions 301*d*, constituting a first mate of the rotation preventive adapter, in match with corresponding angularly spaced recesses formed in the upper portion of an intended implant (not shown), and constituting a second mate of the rotation preventive adapter. The contour formed by the protrusions 301*d*, is inscribed in a polygonal shape 301*i*, which constitutes a polygonal shape inscriber for either the first mate or the second (not shown) mate of the rotation preventive adapter. In the illustrated embodiment the protrusions 301*d* are in alignment with the medians M of the polygonal shape 301*i* which constitutes the inscriber.

Referring back to FIG. 3B, a shape of the abutment member 380 in a lateral cross section thereof through the abutment member 380 at any plane orthogonal to the planner regions 382 and 382*x*, may be projected on a plane 333*b*. A projection of a lateral cross section through the projection of the hexagonal protrusion 301*b* (which is referred to herein also as the projection of the polygonal shape) may also be projected on the same plane 333*b*. Referring now to FIG. 3C showing said projections, the projection 380*p* of the abutment member 380, is asymmetric with respect to the angle bisectors (e.g., the angle bisector B) as well as with respect to the medians (e.g., the median M), of the polygonal shape projected.

According to the presently disclosed subject matter, the straight line 390 which extends from the axis of rotation 331*b* (at the intersection point between bisector B and median M), to a predetermined geometrical reference point 391 on a circumference of the projection 380*p* of the prosthesis support member, forms a predetermined offset angle 392 with a side 393 of the projected hexagonal shape 301*b*. This offset angle is unique per each dental abutment in the series of abutments according to the presently disclosed subject matter. Likewise, in the bottom view of the abutment 300*d* illustrated by FIG. 3E, straight line 390 may be extended from the axis of rotation 331*d* (at the intersection point between bisectors B and medians M), to a predetermined geometrical reference point 391 on a circumference of the projection of the prosthesis support member 380*d* on the plane of the drawing, forms a predetermined offset angle 392 with a side 393 of the inscriber polygonal shape 301*i*. This offset angle is unique per each dental abutment in the series of abutments according to the presently disclosed subject matter. As may be appreciated, the projection of the planner region 382*d* of the prosthesis support member 380*d* on the plane of the drawing, is disposed asymmetrically about the angle bisectors B, as well as about the medians M, at least per one of the abutments in the series.

Figure 3F:
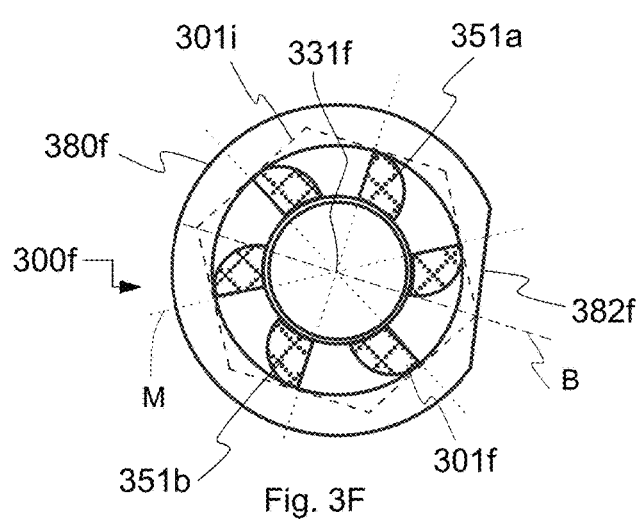
FIG. 3F shows a bottom view of an abutment differing from the embodiment of FIGS. 3D and 3E in the shape of its non-polygonal rotation preventive adapter.

Referring now to FIG. 3F, another embodiment of abutment according to the presently disclosed subject matter is shown. The abutment 300*f*, comprises a non-angled prosthesis support member 380*f*, having a longitudinal axis 331*f*. The abutment lacks rotational symmetry about the axis 331*f*, due to a planner region 382*f* formed on the otherwise cylindrical shape of the prosthesis support member 380*f*. The rotation preventive adapter of the abutment 300*f*, differs from that of the abutment 300*d* of FIG. 3E, in the contour of the protrusions 301*f* which constitute the first mate of the rotation preventive adapter. These protrusions are in match with corresponding recesses formed in the upper portion of an intended implant (not shown), and which constitute a second mate of the rotation preventive adapter. As can be appreciated, the contour of at least one of the mates of the rotation preventive adapter, is inscribed in an imaginary polygonal shape 301*i*. It follows that regardless of the contour of the rotation preventive adapter (e.g., cogwheel shaped, or of any desired contour segment created repetitively a whole number of repeats angularly spaced about the longitudinal axis of the rotation preventive adapter), its positional relationships with respect to the prosthesis support member can be described definitively once an inscriber is assigned to at least one of the mates of the rotation preventive adapter. As can be appreciated, while the recessed mate of the rotation preventive adapter requires the number of angularly spaced recesses to correspond to the number of angular positions that the abutment is designed to possibly take, the protruding mate of the rotation preventive adapter may function properly even if having only two protrusions, e.g., 351*a* and 351*b*, oppositely oriented about the axis of rotation.

Referring now to FIGS. 4A(i)-4C(iii) showing schematic illustrations of a series of angled abutments, in accordance with some exemplary embodiments of the disclosed subject matter.

FIG. 4A(i) illustrates a bottom view of an Angled Abutment 400*a* having an angled structure similar to the angled structure of the embodiment of FIG. 3. The angled structure comprises an Inclined Abutment Member 410, having a Longitudinal Axis 430. In the illustrated embodiment, the projection of the Longitudinal Axis 430 in the plane of the figure is parallel to a reference side 401*t*, of the Hexagonal Protrusion 401 which constitutes male half of the alignment adapter of the angled abutment.

FIG. 4A(ii) illustrates a front view of the Abutment 400*a* illustrated by FIG. 4A(i), with dashed lines marking that indicates a Screw Bore 462 formed through the abutment body and allowing to secure the abutment to an intended implant by a screw.

FIG. 4A(iii) illustrates a front isometric view of the Angled Abutment 400*a* illustrated by FIGS. 4A(i) and 4A(ii). The angled abutment may be secured to an intended dental implant by means of a screw to be inserted through the Upper End 461 of the Screw Bore 462, and to emerge through the Bottom End 463 of the bore, into an intended threading formed in the Dental Implant 570 illustrated by FIG. 5A(i).

FIGS. 4B(i)-4C(iii) illustrate, respectively, bottom, front and side views of two additional angled abutments 400*b* and 400*c*, which together with the angled Abutment 400*a* of FIG. 4A, constitute an abutment series according to the disclosed subject matter. As can be appreciated from FIGS. 4B(i) and 4C(i), the Angled Abutments 400*b* and 400*c*, differ from one another and from the Abutment 400*a* of FIG. 4A, in the offset angle formed between the projection of the Longitudinal Axis 430 of the inclined abutment member and an imaginary straight line tangent to the selected reference side 401*r* of the polygon 401 in the plane of the figure. While in FIG. 4A(i) the reference side 401*r* is parallel to the projection 430 of the longitudinal axis, and is in right angle to axis 433*x*, in FIG. 4B(i) the reference side 401*r* is tilted toward the left hand, and in FIG. 4C(i) is tilted toward the right hand of the projection 430. The uniqueness in the offset angle in each of the angled abutments 400*a*, 400*b*, and 400*c*, is reflected also from the differences in the orientation of the male half 401 of the alignment adapter, in the respective front views 4A(ii), 4B(ii) and 4B(iii), as well as in the respective side views (4B9iii) and 4C(iii). The three angled abutments 400*a*, 400*b*, and 400*c*, can thus allow to position a dental prosthesis on an intended dental implant, in a desired orientation selected from eighteen possible orientations.

Referring now to FIGS. 5A(i)-(ii) and 5(B) showing schematic illustrations of two angled abutments from a series of abutments, in accordance with some exemplary embodiments of the disclosed subject matter.

FIG. 5A(i) and FIG. 5A(ii) illustrate isometric view of two angled abutments from a series of abutments according to the presently disclosed subject matter, the two differ in the predetermined offset angle by which the projection of the longitudinal axis 530 of the inclined member of each, is oriented with respect to a line tangential to a selected reference side 501*r* of the hexagon 501. As a reference and for better emphasizing the consequences of the uniqueness in the offset angle of each of the abutments, the two are positioned above an intended dental implant 570, having a second mate 502 of a hexagonal positioning adapter, and a longitudinal axis illustrated by dashed line 531 of FIG. 5B.

Due to the different unique offset angle formed by the inclined member of each of the angled abutments, these two abutments provide together for additional twelve possible directions that the inclined member may take on the abutment 570, once implanted within the patient's mouth. Additional possible directions may be provided as a function of the number of additional angled abutments in the series.

FIG. 5B illustrates an angled abutment 500c, mounted and secured in a desired orientation on a dental implant 570 having a longitudinal axis illustrated by dashed line 531. A tapering collar 507 of the angled abutment 500c, is situated within, and hence covering and sealing, the top opening of the dental implant 570.

It will be appreciated by persons skilled in the art that the present invention is not limited by what has been particularly shown and described hereinabove. Rather the scope of the invention also includes variations and modifications that would occur to persons skilled in the art upon reading the foregoing description and which are not in the prior art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A series of abutments for dental use, comprising a plurality of abutments, the series comprises at least three abutments, each abutment comprising:
   (i) a first mate of a polygonal rotation preventive adapter having in a lateral cross section thereof a contour being a polygonal or virtually inscribed in a polygonal shape, and having an axis of rotation perpendicularly to said lateral cross section, said first mate being configured to engage with a second mate of the polygonal rotation preventive adapter formed in an intended dental implant, wherein each interior angle of said polygonal shape is geometrically associated with an angle bisector, wherein each side of said polygonal shape is geometrically associated with a median; and
   (ii) a prosthesis support member extending from a proximal end of said first mate and having rotational symmetry order 3 or less with respect to said axis of rotation; wherein
      at least in one of the abutments, a projection of the prosthesis support member on a plane of said lateral cross section is asymmetric with respect to the angle bisectors as well as with respect to the medians, of the polygonal shape, and wherein an angle between a straight line extending from the axis of rotation to a predetermined geometrical reference point on a circumference of the projection of the prosthesis support member forms a predetermined offset angle with a side of the polygonal shape, wherein the predetermined offset angle is unique per each dental abutment in the series, wherein the predetermined offset angle is a sum of a predetermined first angle and a division by a predetermined whole number between three and ten, of a central angle between neighboring angle bisectors of the polygonal shape.

2. The series of dental abutments according to claim 1, wherein the prosthesis support member is an inclined abutment member, wherein a first projection of a longitudinal axis of the inclined abutment member on the plane of said lateral cross section, forms a second predetermined offset angle with a second projection being a projection of a straight line tangent to a selected side of the first half of the polygonal rotation preventive adapter on said plane; wherein the second predetermined offset angle is unique per each dental abutment in the series, and wherein the first projection of at least one of the abutments in the series is unique in that it is unparallel to angle bisectors and unparallel to medians of the polygonal shape.

3. The series of dental abutments according to claim 2, wherein the number of sides of the polygon contour, is between three and eight.

4. The series of dental abutments according to claim 2, wherein the polygon is a hexagon.

5. The series of dental abutments according to anyone of claims 2-4, wherein the abutments in the series structurally differ one from another only in the size of the predetermined offset angle.

6. The series of dental abutments according to claim 1, wherein the number of abutments in the series is smaller by one from the predetermined whole number.

7. A method of aligning a prosthesis within a patient's mouth, the method comprising:
   (i) implanting a dental implant in a selected position within the patient mouth;
   (ii) providing a series of abutments having characteristics according to claim 1;
   (iii) selecting from the series a first abutment having a first predetermined offset angle and securing it temporarily on top of the dental implant;
   (iv) temporarily positioning the prosthesis on the selected abutment and examining if the dental prosthesis is in satisfying alignment with neighboring objects within the patient's mouth;
   (v) in case the alignment does not satisfy, skipping to step (vi), or resecuring the first abutment temporarily in another orientation as allowed by the polygonal rotation preventive adapter and repeating examining whether the dental prosthesis became satisfactorily aligned;
   (vi) in case the alignment still does not satisfy, repeating steps (iii) to (v) with a second abutment from the series, in substitution of the first, wherein the predetermined offset angle of the second abutment is greater or smaller by a first predetermined amount of degrees than the predetermined offset angle of the first;
   (vii) in case the alignment still does not satisfy, repeating steps (iii) to (v) with a third abutment from the series, in substitution of the first, wherein the predetermined offset angle of the third abutment is greater or smaller by a second predetermined amount of degrees than the predetermined offset angle of the first.

8. A method for automated selection of an abutment for a prosthesis to be secured to that abutment within a patient's mouth, the method comprising:
 (i) obtaining a three-dimensional image of at least a region of the patient's mouth in which the prosthesis is intended to be situated, wherein the three-dimensional image comprises an image of a proximal portion of a dental implant to which the abutment to be selected is to be permanently connected;
 (ii) automatically identifying at least the spatial orientation of the dental implant with respect to dental constituents neighboring to a space to be occupied by the prosthesis, wherein said automatically identifying is performed using computational image processing techniques;
 (iii) automatically calculating a desired set of values of the abutment, wherein the set of values is calculated based on the at least the spatial orientation of the dental implant and on parameters of said dental constituents, wherein said automatically calculating a set of values is performed with respect to a predetermined set of abutment parameters which an abutment having abutment parameters with such set of values may suit for intermediating between the dental implant and the prosthesis;
 (iv) providing a list of one or more series of abutments ranked by proximity of their individual set of values to said desired set of values, wherein said list of one or more series of abutments comprises abutments having individual set of values within a predetermined tolerance from the desired set of values, within a database of a multiple series of abutments according to claim 1, which the database includes per each abutment an individual set of values per the predetermined set of parameters, and memorizing results of said searching as a list of one or more series of abutments ranked by proximity of their individual set of values to said desired set of values; or
 (v) providing from said database a second list of series of abutments ranked according to proximity of individual set of values of abutments in each series to said desired set of values.

9. The method according to claim 8, further comprising
 (vi) submitting an order to a relevant supplier of dental abutments, for one or more series of abutments from the list or the second list, based on a computerized decision taken under considerations of rank of a series of abutments in the list, price, and estimated delivery date.

* * * * *